FACSIMILE TRANSMITTER SHEET FEEDING MECHANISM

Filed May 31, 1962 2 Sheets-Sheet 1

INVENTOR.
RALPH VARRICHIO
BY Edward F. Connors
attorney

May 18, 1965 R. VARRICHIO 3,184,231

FACSIMILE TRANSMITTER SHEET FEEDING MECHANISM

Filed May 31, 1962 2 Sheets-Sheet 2

INVENTOR.
RALPH VARRICHIO
BY Edward V. Connors
Attorney

United States Patent Office 3,184,231

Patented May 18, 1965

3,184,231
FACSIMILE TRANSMITTER SHEET FEEDING MECHANISM

Ralph Varrichio, Brooklyn, N.Y., assignor to Hogan Faximile Corporation, New York, N.Y.
Filed May 31, 1962, Ser. No. 199,045
4 Claims. (Cl. 271—36)

The present invention relates to the art of electric facsimile transmission and more particularly to a facsimile transmitter sheet feeding mechanism.

In the art of facsimile transmission and reception of graphic material, such as printed matter or pictures, the subject copy is moved past an illuminated scanning line and a reflected image of the copy is scanned to produce a chain of electric video signals. These electric signals are transmitted to a remote point by radio or wire and after amplification are used to actuate a recorder to produce marks on the recording sheet corresponding to subject copy.

In a commercial facsimile system it may be necessary to transmit the information from a wide range of subject copy varying for example, from wrinkled onionskin copies to cardboard. The subject capy may have considerable variation in length from sheet to sheet. Inasmuch as the wire or radio link may be quite expensive it is desirable to use the link to its fullest capacity by sending one facsimile after another as rapidly as possible. For this reason the use of an automatic feeding mechanism is necessary from an economic standpoint. In a facsimile system it is important that each single sheet of subject copy be spaced from the preceeding copy so as to allow an interval for control signals to be transmitted indicating the start and end of each sheet of copy.

An object of the present invention is to provide a facsimile transmitter sheet feeding mechanism adapted to be coupled with the scanning mechanism of a transmitter so as to present successive sheets of subject copy to the transmitter as rapidly as the transmitter can handle same.

Another object of the invention is to provide a facsimile transmitter sheet feeding system which is simple and economical in manufacture and reliable in use.

Other objects and advantages of the invention will be apparent from the following description and from the accompanying drawings which show, by way of example, an embodiment of the invention.

Figure 1:
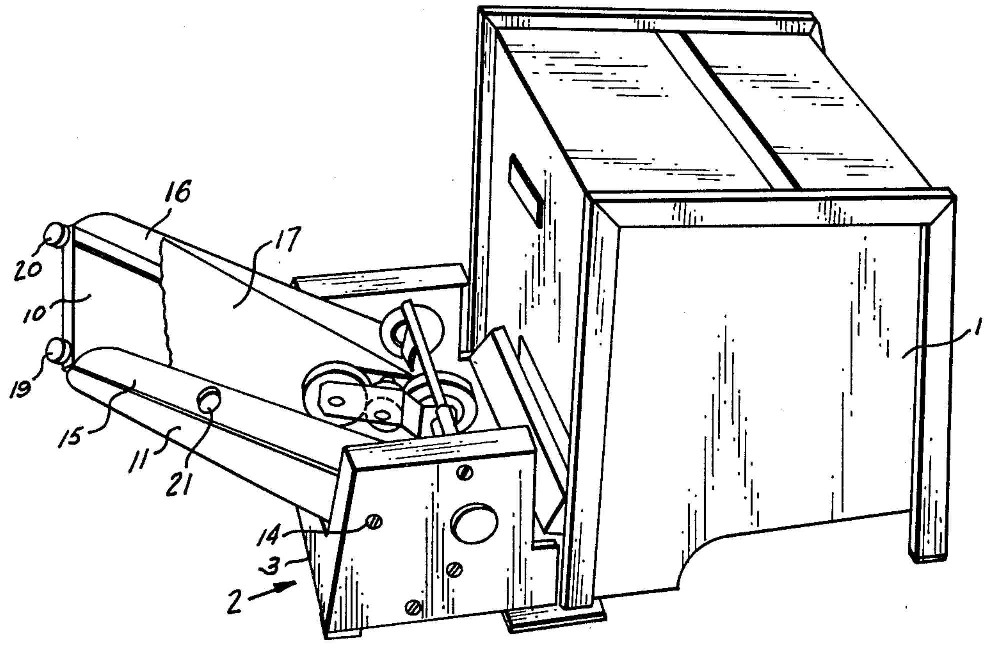
FIGURE 1 is a perspective view of a facsimile transmitter including sheet feeding mechanism in accordance with the invention.

Referring to the drawings there is shown in FIGURE 1 a facsimile transmitter 1 incorporating a facsimile transmitter sheet feeding mechanism 2 in accordance with the invention.

The sheet feeding mechanism 2 includes a frame 4 with upwardly directed side members 5 and 6. A paper guide tray 10 is inclined downwardly at an angle of about fifty degrees with the horizontal, the lower end of the guide tray forming an outlet. The paper tray 10 is formed with a pair of downwardly depending stiffening members 11 which are perforated so as to be secured in the frame by rod 12 having a screw 14 engaged in its end holding the rod in position in the frame.

On the upper surface of the paper tray 10 is a pair of flange members 15 and 16 which are both adjustable towards each other to accommodate various sizes of sheets of paper 17. The flange members 15 and 16 have their lower ends turned under so as to engage the outlet end of the paper tray 10 and their upper ends are apertured and provided with thumb screws 19 and 20 so positioned as to engage behind the upper edge of the paper tray 10. A rod 21 extends between the flange members 15 and 16 to hold the paper in position.

Figure 3:
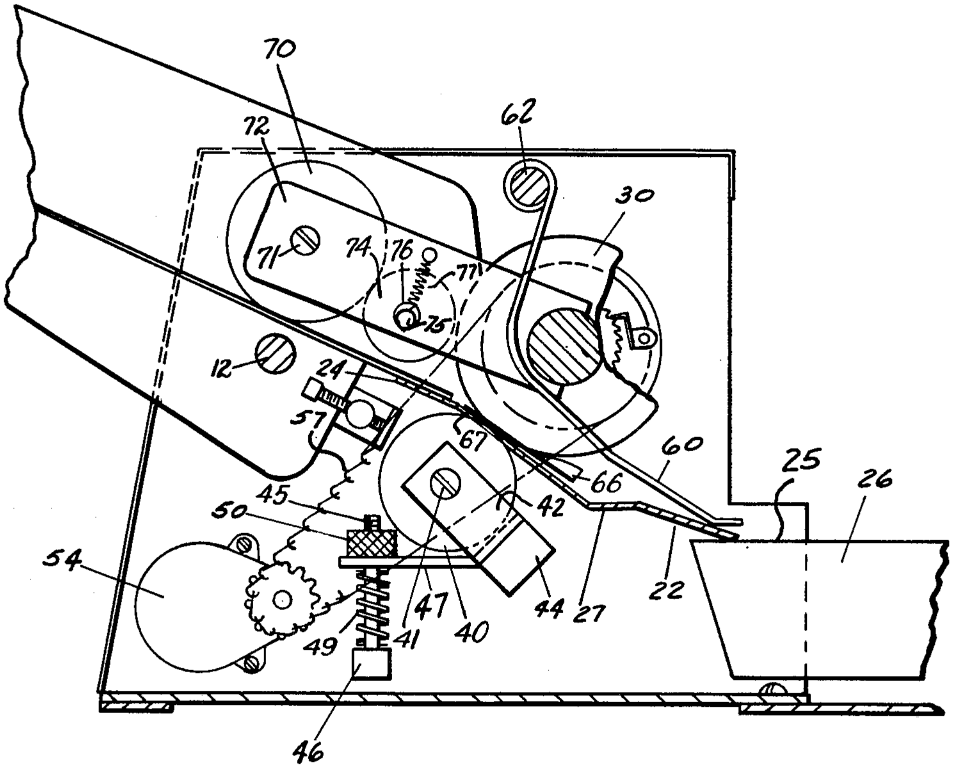
FIGURE 3 is a fragmentary sectional view taken along the line 3—3 of FIGURE 2.

At the bottom of the paper tray 10 is an extension member 22 (FIGURE 3) secured in position as indicated at 24 at the lower end and on the underside of the paper tray 10. The extension member 22 is adapted to rest on the feeding surface 25 of feeding pedestal 26 of the copy feed of the transmitter. The copy feed is shown and described more fully in a copending application titled Facsimile Transmitted Copy Feed filed by Gerald G. Murphy.

Figure 2:
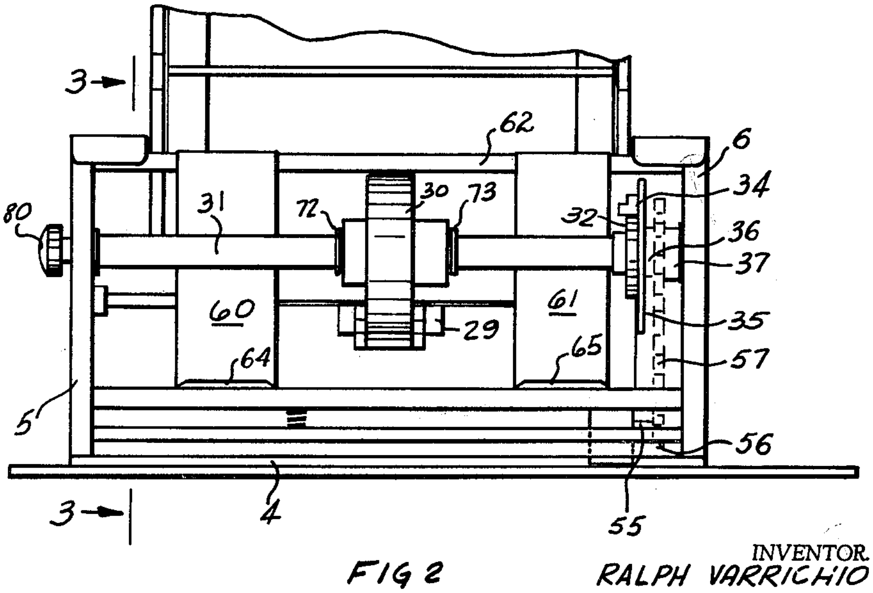
FIGURE 2 is an end view of the sheet feeding mechanism as seen from the transmitter.
Figure 4:
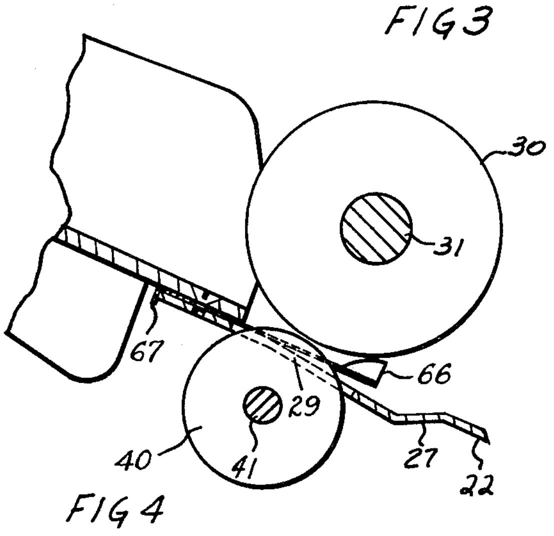
FIGURE 4 is a fragmentary view of a portion of FIGURE 3 at an enlarged scale.

The extension 22 is provided with a formed shape as indicated at 27 for ease of manufacture and to provide a resilient engagement with the feeding surface 25 of the copy feed. The formed shape 27 has been found to be extremely satisfactory in directing the paper downwardly towards the feeding surface 25. In the event a curved shape were used there would be a tendency for the leading edge of the paper to be directed upwardly rather than downwardly and across the feeding surface 25. The extension 22 has an opening 29 therein (FIGURES 2 and 4).

A rotatable feed roller 30 is carried by shaft 31 journalled in side members 5 and 6 and positioned so that its periphery is directly above and in the same plane as the opening 29 in the extension 22. The roller 30 has a yieldable paper engaging surface preferably formed of soft rubber of a Durometer reading of approximately forty to forty-five. At the end of the shaft 31 is a ratchet 32 secured and rotatable with the shaft 31. Positioned in operative relationship therewith is a spring urged pawl 34 secured to a disc 35. The disc 35 has a hub 36 extending therefrom and carrying a sprocket 37.

Positioned beneath the feed roller 30 is a fixed roller 40 supported by a screw shaft 41 extending through brackets 42 supported by a square tie rod 44 pivotably carried by the side members 5 and 6. The roller 40 has a resilient surface preferably of rubber but with a higher Durometer reading than that of the feed roller 30, the Durometer reading for the fixed roller 40 ranging between fifty-five and sixty. The roller 40 is fixed in position so that it does not rotate. However, after some use of the mechanism, a slightly worn surface of the roller 40 may appear at its paper engaging surface in which event an adjustment is made by loosening the screw 41 and slightly rotating the roller 40, then again securing it in position.

Adjustment means to vary the relative position between the rollers 30 and 40 are provided including a screw 45 extending from a tie rod 46 and extending through an opening in a bracket member 47 secured to bracket 42. A spring 49 normally tends to urge the bracket 47 upwardly against the action of a nut 50. The adjustment of the pressure between the rollers 30 and 40 is achieved by adjusting the position of the nut 50 on the screw 45. In a preferred operative position the rollers 30 and 40 are adjusted so that they just barely touch together, the point of contact being in the plane of the top surface of the paper tray 10.

In order to rotate the roller 30 a motor 54 is provided having a shaft 55 at the end of which is a driving sprocket 56. A chain 57 interconnects the driving sprocket 56 with the sprocket 37 on the shaft 31.

The sheet feeding mechanism will operate with single sheets of subject copy 17 which may vary in thickness from heavy cardboard to light onionskin. The mechanism will even accept onionskin in a somewhat wrinkled condition. In order to hold the leading edge of any wrinkled sheets in proper position to be received by the copy feed, a pair of curved paper holders 60 and 61 are provided and secured in position by having their upper ends rolled over a tie rod 62 secured in the frame members 5 and 6. The paper holders 60 and 61 are formed in a gradual arc passing under the shaft 31, their lower ends being turned upwardly to form flanges 64 and 65. The curvature of the paper holders 60 and 61 has been adjusted so that when their flared ends 64 and 65 are positioned in contact with the extension 22 there is a space of approximately one quarter of an inch from the arced surfaces thereof to the shaft 31. This shape was selected so as to provide for variations in the thickness of the subject copy which, as stated above, may vary from onionskin to thick cardboard. As described, the paper holders 60 and 61 have a tendency to lie down on the surface of the paper and in the event it is wrinkled onionskin a somewhat smoothing action of the wrinkled paper is had.

In order to prevent slippage of the paper sheets 17 a Teflon shoe 66 is provided positioned under the roller 30 and on the downstream side thereof. The shoe 66 is supported at the end of a bifurcated spring member 67 secured at the lower end of the tray 10 at the same position as is attached the extension 22. The spring member 67 is bifurcated so that it passes on opposite sides of the roller 30.

Under conditions of low humidity it is possible for the pile of sheets of paper 17 to become charged with static and thus tend to adhere together. In order to assure the feeding of the individual sheets 17 under such conditions an upstream roller 70 is provided. It is supported by a screw shaft 71 carried between brackets 72 and 73 pivotably supported on the shaft 31. Also carried by the brackets 72 and 73 is an idler roller 74 supported by a shaft 75, the shaft 75 retained in oversize holes 76 and maintained in pressure contact between the rollers 30 and 70 by a spring 77, the oversized hole 76 providing space for the necessary movement of the shaft 75. The roller 70 is provided with a resilient surface of soft rubber having approximately the same Durometer reading as the roller 30.

A knob 80 is provided at the end of the shaft 31 so that single sheets of paper can be advanced, as for example in the starting position, to save operating time of the transmitter. The rotation of the shaft 31 under such conditions is facilitated by the slipping of the pawl 34 over the ratchet 32.

The rotational speed of the feed roller 30 is selected somewhat slower with respect to the speed of the copy feed in order that a space may be had between individual sheets of subject copy, this space being necessary in order that the transmitter may send cut off or other signals to the receiver. The speed variation also prevents the chance of an overlap of the leading edge of a following sheet of copy over the trailing edge of a previous sheet as the higher speed of the copy feed draws the leading sheet away from the sheet feeding mechanism. In a commercial operation it has been found desirable that the space between successive sheets of copy should be at least three quarters of an inch.

While the invention has been described and illustrated with respect to a specific embodiment thereof it will be understood that other embodiments may be resorted to without departing from the invention. Therefore, the form of the invention set out above should be considered as illustrative and not as limiting the scope of the following claims.

I claim:

1. A facsimile transmitter sheet feeding mechanism comprising a frame, a paper guide tray inclined downwardly and adapted to receive a pile of single sheets, the lower end of the guide tray forming its outlet, an extension for the bottom of the tray, the extension having an opening therein, a rotatable feed roller, a shaft journalled in the frame, the feed roller positioned with its periphery in alignment with the opening, a fixed retard roller positioned beneath the opening in alignment with the rotatable roller, the rotatable feed roller having a yielding paper engaging surface, the rollers closely positioned together, supporting means for the fixed roller, adjustment means to vary the position of the fixed roller, means for the release of the fixed roller providing rotatable adjustment thereof, and a spring member secured at one end to the outlet end of the tray and bifurcated to pass on both sides of the feed roller, a shoe for the spring member directed upwardly against the feed roller downstream side and extending under the feed roller and around the downstream side thereof outwardly of a center line between the axes of the feed and retard rollers so as to provide increased area of contact between a sheet of paper and said feed roller.

2. A facsimile transmitter sheet feeding mechanism comprising a frame, a paper guide tray inclined downwardly and adapted to receive a pile of single sheets, the lower end of the guide tray forming its outlet, an extension for the bottom of the tray, the extension having an opening therein, a rotatable feed roller, a shaft journalled in the frame, the feed roller positioned with its periphery in alignment with the opening, a fixed retard roller positioned beneath the opening in alignment with the rotatable roller, the rotatable feed roller having a yielding paper engaging surface, the rollers closely positioned together, supporting means for the fixed roller, adjustment means to vary the position of the fixed roller, means for the release of the fixed roller providing rotatable adjustment thereof, a pair of curved paper holders extending towards the extension for the paper tray so as to bear against the top surface of a sheet of paper passing thereover, a supporting rod for the paper holders, the supporting rod positioned in approximate vertical alignment with the shaft for the feed roller, the paper holders curved forwardly under the feed roller shaft and terminating adjacent the edge of the tray extension, a spring member secured at one end to the outlet end of the tray and bifurcated to pass on both sides of the feed roller, and a shoe for the spring member directed upwardly towards the feed roller downstream side in spaced relationship to the location at which the rollers are closely positioned together, whereby the shoe is adapted to maintain the sheet in contact with the feed roller over an increased area.

3. A fascsimile transmitter sheet feeding mechanism comprising a frame, a paper guide tray inclined downwardly and adapted to receive a pile of single sheets, the lower end of the guide tray forming its outlet, an extension for the bottom of the tray, the extension having an opening therein, a rotatable feed roller, a shaft journalled in the frame, the feed roller positioned with its periphery in alignment with the opening, a fixed retard roller positioned beneath the opening in alignment with the rotatable roller, the rotatable feed roller having a yielding paper engaging surface, the rollers closely positioned together, supporting means for the fixed roller, adjustment means to vary the position of the fixed roller, means for the release of the fixed roller providing rotatable adjustment thereof, a pair of curved paper holders extending towards the extension for the paper tray so as to bear against the top surface of a sheet of paper passing thereover, a supporting rod for the paper holders, the supporting rod positioned in approximate vertical alignment with the shaft for the feed roller, the paper holders curved forwardly under the feed roller shaft and terminating adjacent the edge of the tray extension, a spring member secured at one end to the outlet end of the tray and bifurcated to pass on both sides of the feed roller, and a shoe for the spring member directed upwardly against the feed roller downstream side in spaced relationship to the location at which the rollers are closely positioned together, whereby the shoe is adapted to maintain the sheet in contact with the feed roller over an increased area.

4. A facsimile transmitter sheet feeding mechanism comprising a frame, a paper guide tray inclined downwardly and adapted to receive a pile of single sheets, the lower end of the guide tray forming its outlet, an extension for the bottom of the tray, the extension having an opening therein, a rotatable feed roller, a shaft journalled in the frame, the feed roller positioned with its periphery in alignment with the opening, a fixed retard roller positioned beneath the opening in alignment with the rotatable roller, the rotatable feed roller having a yielding paper engaging surface, the rollers closely positioned together, supporting means for the fixed roller, adjustment means to vary the position of the fixed roller, means for the release of the fixed roller providing rotatable adjustment thereof, motor driving means, a driving sprocket carried by the feed roller shaft, chain driving means interconnecting the motor driving means and the sprocket, a ratchet and pawl mechanism interconnecting the sprocket and the shaft for the feed roller, a pair of curved paper holders extending towards the extension for the paper tray so as to bear against the top surface of a sheet of paper passing thereover, a supporting rod for the paper holders, the supporting rod positioned in approximate vertical alignment with the shaft for the feed roller, the paper holders curved forwardly under the feed roller shaft and terminating adjacent the edge of the tray extension, a spring member secured at one end to the outlet end of the tray and bifurcated to pass on both sides of the feed roller, and a shoe for the spring member directed upwardly against the feed roller downstream side, an upstream drive roller in spaced relationship to the location at which the rollers are closely positioned together, whereby the shoe is adapted to maintain the sheet in contact with the feed roller over an increased area.

References Cited by the Examiner

UNITED STATES PATENTS

| | | | |
|---|---|---|---|
| 1,051,726 | 1/13 | Gammeter | |
| 1,426,904 | 8/22 | Olson | 271—36 |
| 2,359,856 | 10/44 | Morse | 271—36 |
| 2,762,623 | 9/56 | Uthenwoldt et al. | 271—36 |
| 2,813,714 | 11/57 | Herrick | 271—36 XR |
| 3,047,290 | 7/62 | Thomsen | 271—36 |

ROBERT B. REEVES, *Acting Primary Examiner.*

ROBERT A. LEIGHEY, WILLIAM B. LA BORDE, *Examiners.*